US005859594A

United States Patent [19]

King et al.

[11] Patent Number: 5,859,594

[45] Date of Patent: Jan. 12, 1999

[54] SELECTIVE CALL RECEIVER HAVING SELECTABLE DISPLAYS

[75] Inventors: Jeffrey Scott King, Boynton Beach; Silvia M. Viteri, Lantana, both of Fla.

[73] Assignee: Motorola, Inc., Schaumburg, Ill.

[21] Appl. No.: 115,975

[22] Filed: Sep. 3, 1993

Related U.S. Application Data

[63] Continuation of Ser. No. 839,713, Feb. 24, 1992, abandoned, which is a continuation of Ser. No. 545,157, Jun. 28, 1990, abandoned.

[51] Int. Cl.[6] .................................................... H04Q 1/00

[52] U.S. Cl. ........................ 340/825.44; 455/347; 345/1; 345/901

[58] Field of Search ........................... 340/825.44, 311.1; 345/1, 901; 455/347; 379/8; 370/82, 83

[56] References Cited

U.S. PATENT DOCUMENTS

| | | | |
|---|---|---|---|
| 3,816,674 | 6/1974 | Andrews, Jr. et al. | 379/8 |
| 4,369,443 | 1/1983 | Giallanza et al. | 340/825.47 |
| 4,477,807 | 10/1984 | Nakajima et al. | 340/825.44 |
| 4,626,842 | 12/1986 | Ichikawa et al. | 340/825.44 |
| 4,684,935 | 8/1987 | Fujisaku et al. | 340/717 |
| 4,688,035 | 8/1987 | Gray et al. | 340/825.44 |
| 4,870,402 | 9/1989 | DeLuca et al. | 340/311.1 X |
| 4,940,975 | 7/1990 | Ide et al. | 340/825.44 |
| 5,051,740 | 9/1991 | Barr | 340/825.44 |
| 5,099,507 | 3/1992 | Mukai | 340/825.44 |

FOREIGN PATENT DOCUMENTS

| | | | |
|---|---|---|---|
| 0067594 | 3/1990 | Japan | 340/717 |

*Primary Examiner*—Brian Zimmerman
*Attorney, Agent, or Firm*—Philip P. Macnak; Keith A. Chanroo

[57] ABSTRACT

A selective call receiver (100) comprises a receiver (104) for receiving a message and a controller (112) having the capability of determining the length of a received message. At least one of at least two displays (110, 120) is selected to display the received message according the received message length.

8 Claims, 6 Drawing Sheets

SELECTIVE CALL RECEIVER HAVING SELECTABLE DISPLAYS

This is a continuation of application Ser. No. 07/839,713 filed Feb. 24, 1992 now abandoned which is a continuation of application Ser. No. 07/545,157, filed Jun. 28, 1990 now abandoned.

FIELD OF THE INVENTION

This invention relates in general to selective call receivers, and more specifically to a selective call receiver capable of determining received message length and displaying the message on a first or second display.

BACKGROUND OF THE INVENTION

Typically, a selective call receiver includes a display device for displaying a message. Such a display is usually adequate for displaying short messages, such as, telephone numbers. However, selective call receiver users require the selective call receiver to be capably of receiving longer messages. One of several techniques currently available for presenting a long message to the user comprises displaying the message in a line-by-line (or segment-by-segment) manner to achieve a "scrolling" of the message on the display. However, certain messages, such as graphics or a long character string, are not easily presented by scrolling.

Of course, simply replacing the small display for a larger display may allow presentation of long messages, but such an arrangement wastes energy and reduces battery life when short messages are received. That is, selective call receivers are power-limited devices that may not be able to supply the higher current requirements of larger displays without significantly reducing battery life. Regrettably, a selective call receiver having a selectable display has been heretofore unavailable, thus failing to satisfy the need for efficiently displaying both long and short messages without overburdening the power supply of the selective call receiver. Accordingly, a need exists for a selective call receiver having selectable displays.

Summary of the Invention Briefly, according to the invention, a selective call receiver comprises a receiver for receiving a message and determining the length of the received message. According to the invention, one of at least two displays is selected to display the received message according the received message length.

DESCRIPTION OF A PREFERRED EMBODIMENT

Figure 1:
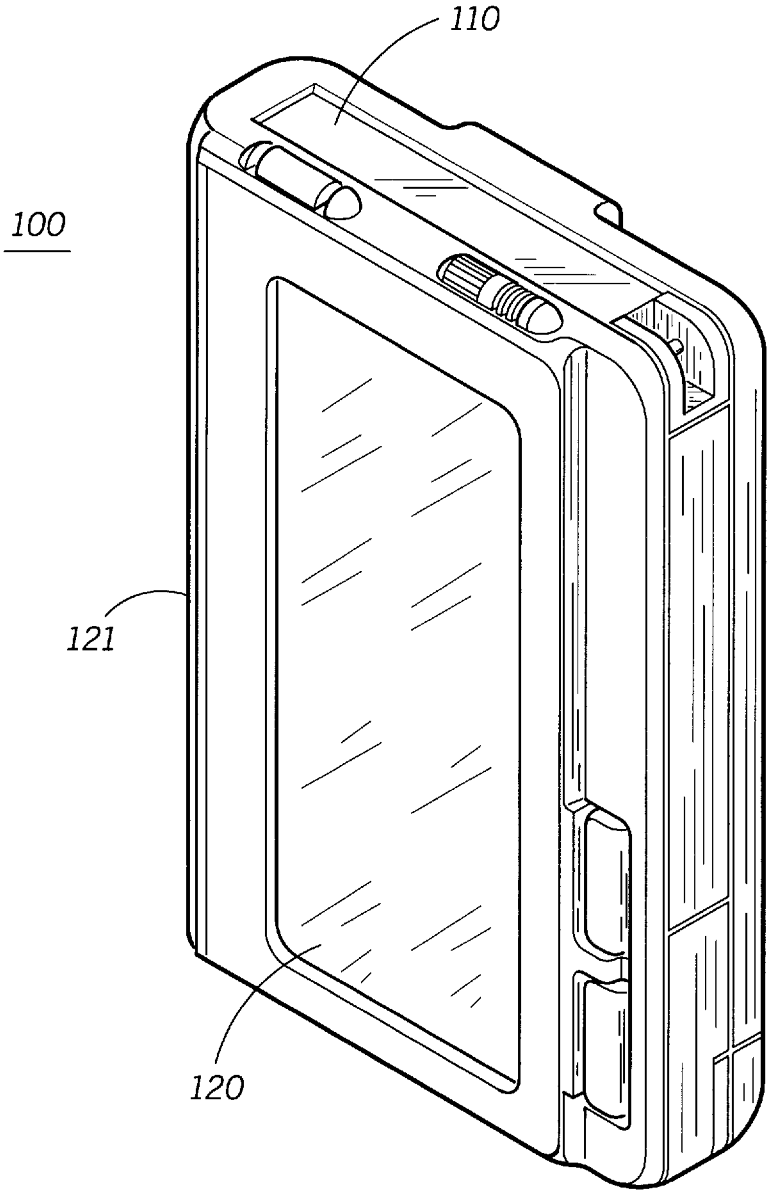
FIG. 1 is a perspective view of a selective call receiver in accordance with the present invention.

According to the preferred embodiment of the invention, FIG. 1 illustrates a selective call receiver 100 comprising a housing 121 with at least two display devices 110, 120, which are preferably located in two different planes of view. The smaller display 110 is located in a plane such that the display may be easily read while the selective call receiver 100 is secured in a carrying position (e.g., attached to a belt, clipped to a shirt pocket, on a purse etc.). The user, after being alerted of a received message, may view the first display (small display) 110 to either read a short message or to be informed that a long message was received. The larger display 120 may be manually or automatically activated to display a long message. Those skilled in the art will appreciate that graphics-type messages are substantially longer than alpha-numeric messages thus limiting the display selection to a determination of the received message length. After reading the long message, the large display 120 maybe automatically or manually deactivated to save battery power.

According to the invention, the first display 110 is capable of displaying messages such as telephone numbers or short character strings. Conversely, the second display 120 is capable of displaying messages such as graphics or long character strings. Messages displayed on the second display 120 are preferably substantially longer than the messages displayed on the first display 110. This arrangement makes the selective call receiver of the present invention more efficient and compatible with several message types, because other message types are substantially longer messages.

Figure 2:
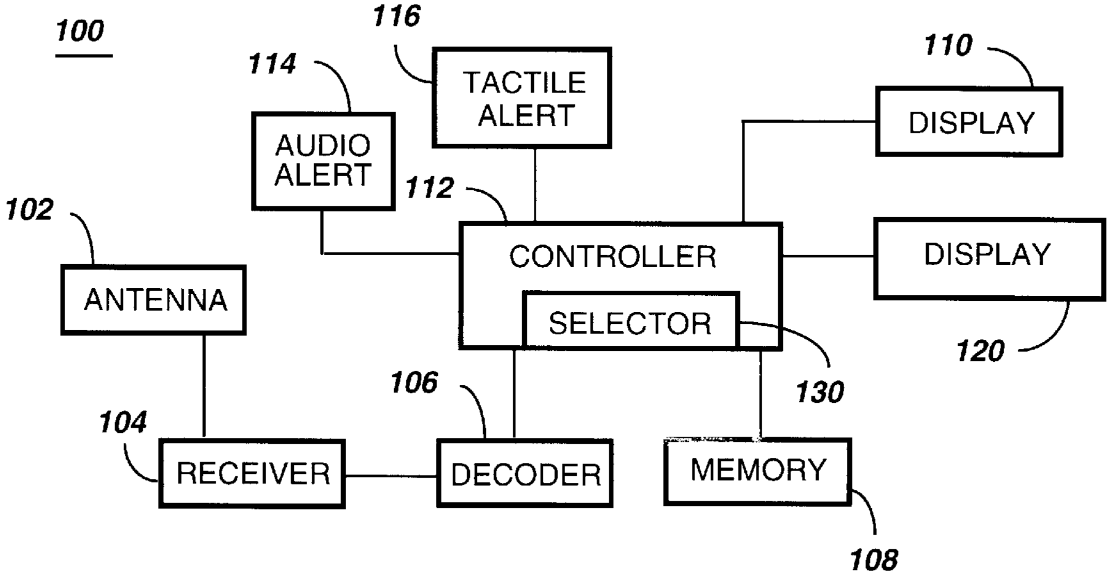
FIG. 2 is a block diagram of a selective call receiver in accordance with the present invention.

Referring to FIG. 2, a selective call radio receiver 100 (e.g., a pager) comprises an antenna 102 that provides an RF carrier signal that is mixed with a local oscillator signal contained within a receiver module 104. The receiver module 104 generates a recovered signal suitable for processing by a decoder 106 in a manner well known to those skilled in the art. The decoder 106 converts the received signal into an address which is compared by a controller 112 with one or more predetermined addresses contained in a memory 108. When the addresses are substantially similar, the user is alerted that a message has been received either by an audio alert (e.g., speaker) 114 or a tactile alert (e.g., vibrator) 116.

Upon receipt of the message, the controller 112 determines if the received message length is above or below a pre-determined threshold in a manner well known to those skilled in the art. If the message length is below the threshold (i.e., a short message), the message is stored in memory 108 and may be displayed on the small display 110. Alternatively, when the message length is above or equal to the threshold, the message is again stored in memory 108 (or stored in message buffers not shown) and may be presented on the large display 120. Optionally, the controller 112 may present an informational message on the small display 110 to inform the user that a long message was received and may be viewed on the large display 120.

According to the invention, a large message may be displayed either manually or automatically on the large display 120. It can be further appreciated that the controller 112 may simply store the message without presenting the message and when the user attempts to read the message it is automatically directed towards the appropriate display (i.e., the small display 110 or the large display 120). After presenting the message, the large display 120 may be automatically or manually deactivated to conserve battery power.

Those skilled in the art will appreciated that the small display 110 requires substantially less current to operate than the large display 120. Accordingly, the small display is preferably used whenever possible. However, when a long message is received, the large display 120 is activated long enough to display the long message. Subsequent to displaying the long message, the large display 120 is then turned off. The invention's selectable display scheme, is achieved by a selector 130 included within the controller 122 as shown in FIG. 2, thus satisfies the limited current supply of miniatured devices (e.g., selective call receivers) by keeping the display current consumption as controlled as possible.

Figure 3:
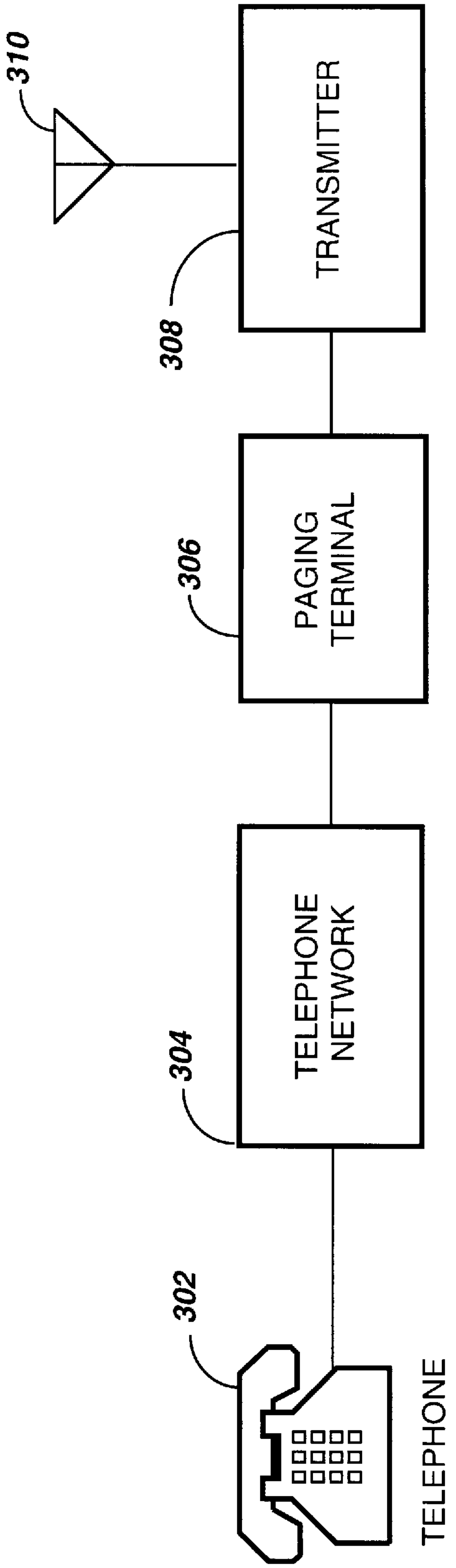
FIG. 3 is a block diagram of a selective call transmitter system in accordance with the present invention.

Referring to FIG. 3, a paging transmitter preferably comprises a telephone 302 through which paging calls are initiated and entered by a system user. As is known, a message may be transmitted to a particular selective call receiver by using the telephone 302 and dialing a pre-assigned telephone number of the desired selective call receiver. The message is routed from the telephone 302 through a public or private telephone network 304 to a selective call receiving terminal 306.

Once "contact" is established with the selective call receiving terminal 306, the user is prompted to enter additional information through the telephone 302 (such as a pager ID). The precise nature of the particular additional information is known to those skilled in the art and depends on the type of selective call receiver the user is paging. For example, a numeric display pager, would require numeric data to be entered by the user through a keypad on the telephone 302. After completion of message entry, the message is processed and stored. The message length is compared to a predetermined threshold, and if the message is equal to or above the threshold, the message is encoded as one of the processing steps (e.g. in a binary mode, a bit may either by encoded a binary-one or binary-zero) for a long message display. Conversely, when the message is less than the threshold, the message may be formatted, as the complement of the long message, for a short message display. After processing, the processed message is queued within the selective call receiving terminal 306, and upon reaching the "top" of the queue, the message is sent to a transmitter 308 where it modulates a radio frequency carrier signal in a conventional manner for transmission to the selective call receiver(s) via antennas 310, 102.

Figure 4:
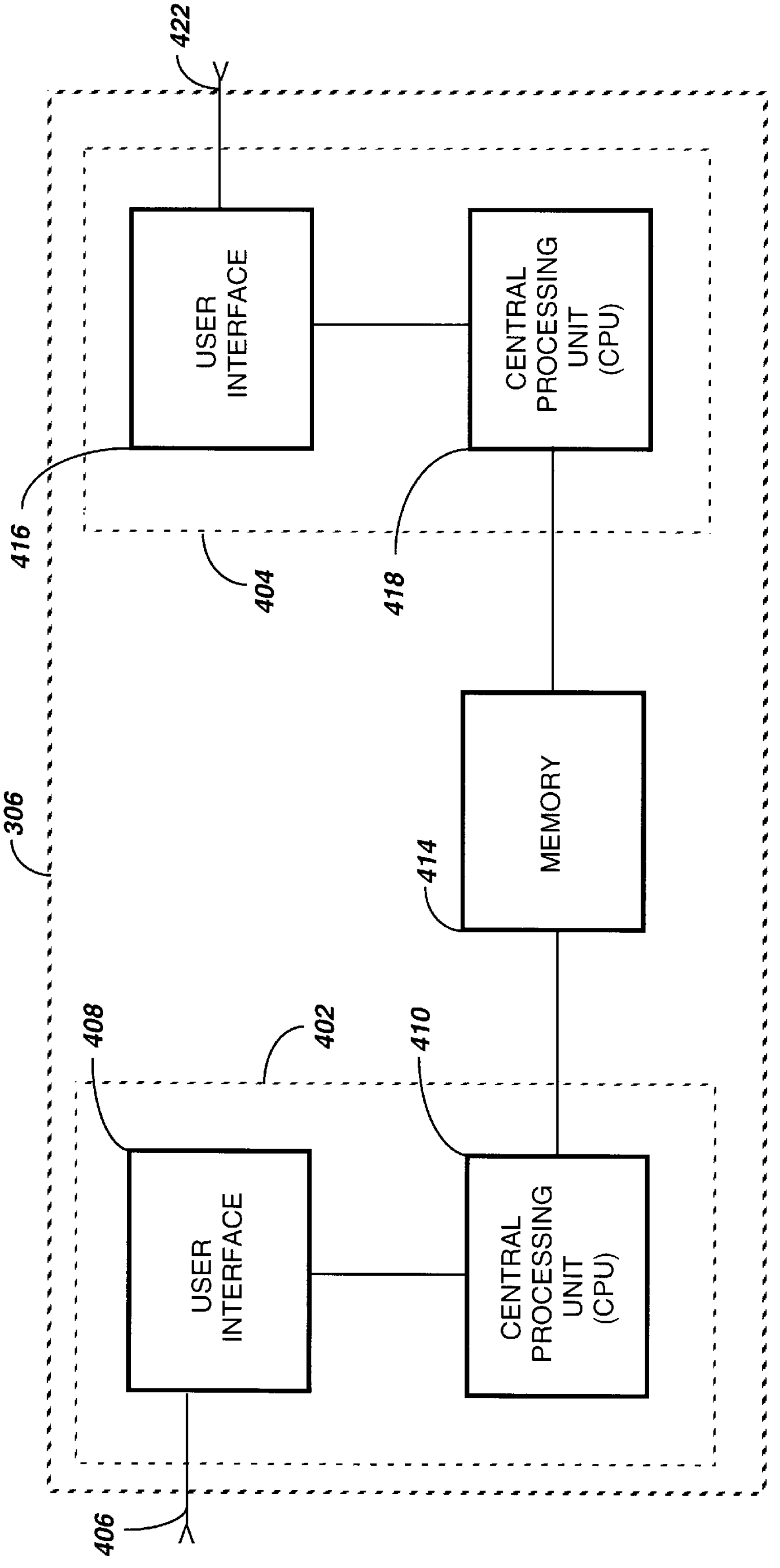
FIG. 4 is a block diagram of the paging terminal of FIG. 3.

Referring to FIG. 4, the selective call receiving terminal 306 in accordance with the present invention is shown in block diagram form. The selective call receiver terminal 306 comprises input circuitry 402 and output circuitry 404. A page received from the telephone network 304 (shown in FIG. 3) enters the input circuitry 402 through an input port 406 of a user interface 408. The user interface 408 comprises the circuitry necessary to couple to the telephone network 304. Subsequently, the message is processed by a central processing unit (CPU) 410. Next, the processed message is output from the CPU 410 to a memory 414. In the memory 414, messages are queued for subsequent transmission to the output circuitry 404, usually on a first in, first out (FIFO) basis. When a message progresses to the "top" of the queue, it is output from the memory 414 to a CPU 418 of the output circuitry 404. The message is then reprocessed and formatted by the CPU 418 before it output to a user interface 416.

According to the invention, the CPU 418 compares the message length to a pre-determined threshold, and if the message is equal to or above the threshold, the message is encoded as one of the processing steps (e.g. in a binary mode, a bit may either by encoded a binary-one or binary-zero) for a long message display. Conversely, when the message is less than the threshold, the message may be formatted, as the complement of the long message, for a short message display. Subsequently, the transmitter modulates the message to an R.F signal in a manner which is known to those skilled in the art.

Figure 5:
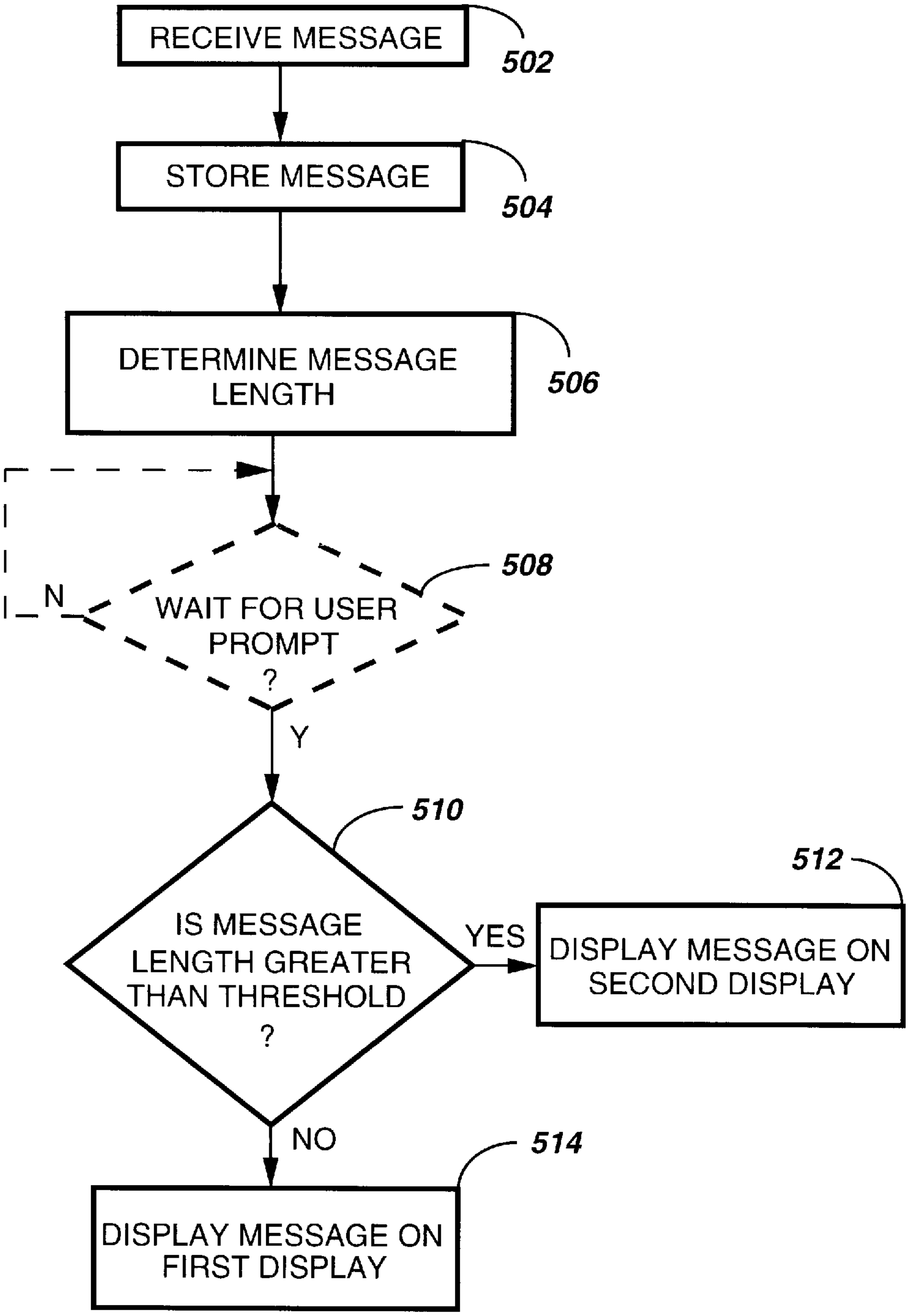
FIG. 5 is a flow chart of the operation of the selective call receiver in accordance with the present invention.

The preferred operation of the selective call receiver 100 (FIG. 2) is shown by the flow chart of FIG. 5. Initially, a message is received (step 502), and stored (step 504). After storing, the message length is compared to a predetermined threshold (step 506). Optionally, the selective call receiver waits for a user prompt or selection before proceeding to select the appropriate display for the message (step 508). Depending on the message length threshold, the message is either routed to the first or second displays (step 510), where the first display 110 comprises the short display and the second display 120 comprises the long display. If the message received is equal to or above the threshold, the message is displayed on the second display (step 512). Alternately, if the received message length is below the threshold, the message is displayed on the first display (step 514).

Figure 6:
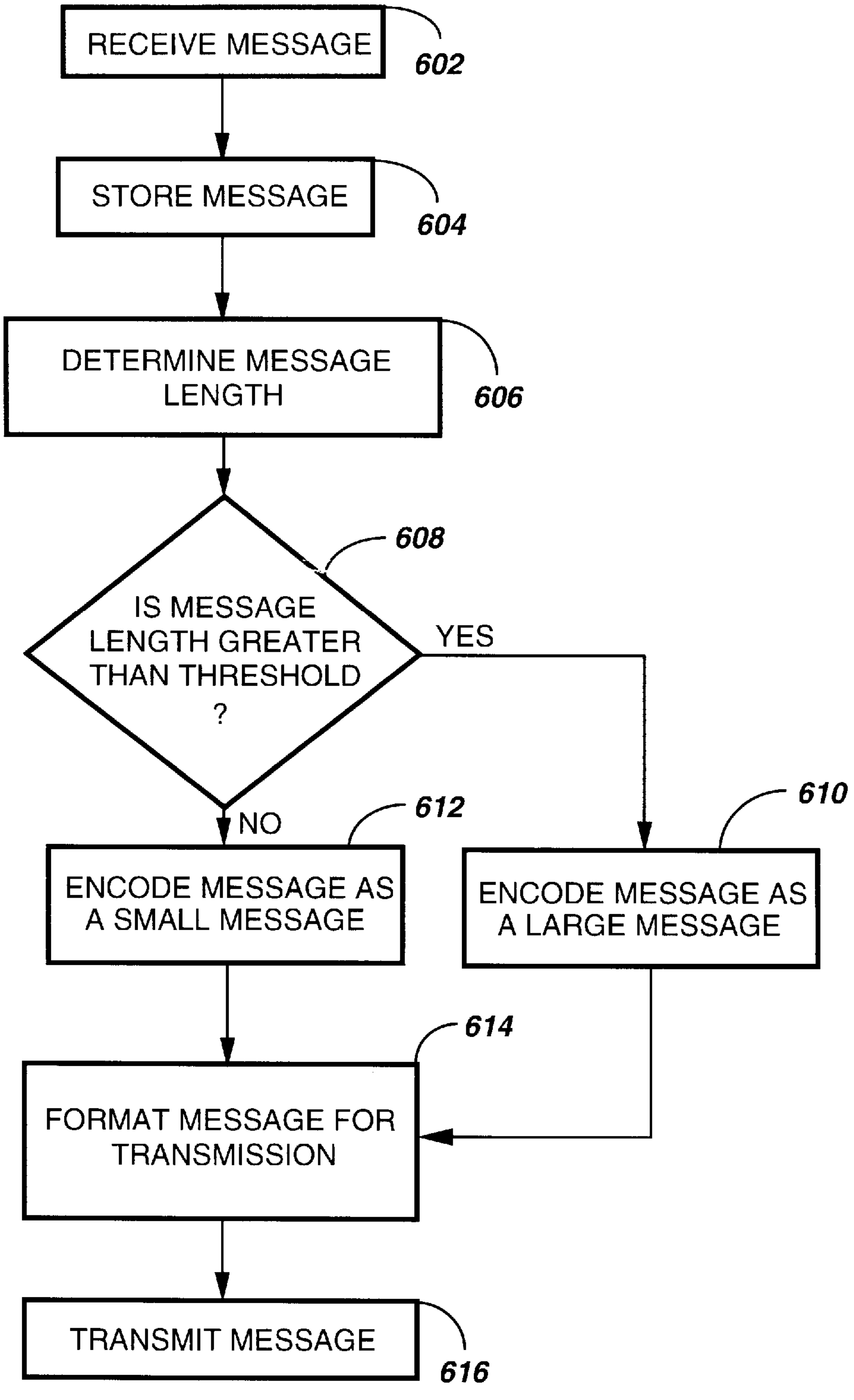
FIG. 6 is a flow chart of the operation of the selective call receiver system terminal in accordance with a second embodiment of the invention.

The operation of the paging terminal 306 (FIG. 4) is shown by the flow chart of FIG. 6. According to the operation of the preferred paging terminal 306, the message is received from the telephone network (step 602) and stored (step 604). After the message length is determined (step 606), the message is encoded as a long message (for the large display), step 610. Alternately, if the received message is below the threshold (step 608), the message is encoded as a small message (for the small display), step 612. The encoded message is formatted for transmission (step 614) and subsequently transmitted (step 616) to at least one selective call receiver 100.

In summary, the invention comprises a method for receiving a message and determining the message length. The message is displayed on a small display if the message is below a threshold, or alternately, displayed on a large display if the message is equal or above the threshold. This invention allows a miniatured device, such as, a selective call receiver to display a long message without overburdening the limited power supply of the device. This is accomplished by selectable displays depending on the received message length Whenever the large display is activated, it is preferably promptly turned off after the message has been displayed to control the current consumption of the selective call receiver.

We claim:

1. A selective call receiver comprising:

means for receiving a first type message and a second type message wherein the first type message being characterized by having a message length less than a predetermined threshold;

determining means, coupled to the receiving means, for determining whether the received message is the first type message or the second type message in response to the message length of the received message and the predetermined threshold;

a housing for enclosing the receiving means and the determining means therein, the housing comprising:

first display means, positioned on and integrally coupled with a first surface of the housing forming a portion of the surface thereof, for displaying the received first type message in response to the determining means; and second display means, positioned on and integrally coupled with a second surface of the housing, for displaying the received second type message in response to the determining means; and a selector, coupled to the determining means, for selecting the second display means for displaying the second type message, and for deselecting the second display means when the second type message has been displayed for conserving battery power.

2. The selective call receiver according to claim 1 wherein the first display means is smaller than the second display means.

3. A selective call receiver system comprising:

a base site controller, comprising:

a transmitter for transmitting first type messages and second type messages to at least one selective call receiver;

determining means, coupled to the transmitter, for determining whether the message to be transmitted is the first type message or the second type message wherein said determining means characterizes the message as being the first type message in response to the message having a message length less than a predetermined threshold; and encoding means responsive to said determining means for encoding the message as the first type message or the second message for transmission to the at least one selective call receiver, said at least one selective call receiver, comprising:

a receiver for receiving the first type message and the second type message;

decoding means, coupled to the receiver, for decoding whether the received message is the first type or second type message;

a housing for enclosing the receiver and the decoding means therein, the housing comprising:

first display means, positioned on and integrally coupled with a first surface of the housing, for displaying the first type message;

second display means, positioned on and integrally coupled with a second surface of the housing, for displaying the second type message; and selecting means for selecting the first or second display means according to the decoding means, the selecting means selecting the second display means for displaying the second type message and deselecting the second display means when the second type message has been displayed for conserving battery power.

4. A method for displaying received messages in a selective call receiver having a housing, comprising the steps of:

a) integrally coupling a first display on a first surface on the housing forming a portion thereof for displaying a first type message and integrally coupling a second display on a second surface on the housing forming a portion thereof for displaying a second type message;

b) receiving the first type message and the second type message;

c) determining whether the received message is the first type message or the second type message wherein said step of determining determines the first type message in response to the message having a message length less than a predetermined threshold;

d) displaying the received first type message on the first display determined in step (c); and e) displaying the received second type message on the second display determined in step (c) wherein the step of displaying the second type message further comprising the steps of:

(f) selecting the second display for displaying the second type message; and (g) deselecting the second display when the second type message has been displayed for conserving battery power of the selective call receiver.

5. The selective call receiver according to claim 1 wherein the first display means has a known characteristic for displaying the first type message and wherein the first surface is oriented in a first plane of said housing.

6. The selective call receiver according to claim 1 wherein the second display means has a known characteristic for displaying the second type message and wherein the second surface is oriented in a second plane of said housing.

7. A selective call receiver, comprising:

a receiver for receiving a first type message and a second type message wherein the first type message is characterized by having a message length less than a predetermined threshold;

a determinator, coupled to the receiver, for determining whether a received message is the first type message or the second type message in response to the message length of the message and the predetermined threshold;

a first display, coupled to the receiver, for displaying the first type message in response to the determinator, said first display being integrally coupled on a first surface of a housing for enclosing the receiver and the determinator; and a second display, coupled to the receiver, for displaying the second type message in response to the determinator, said second display being integrally coupled on a second surface of said housing; and a selector for conserving battery power by selecting the second display, responsive to the determinator, for displaying the second type message and deselecting the second display when the second type message has been displayed.

8. A selective call receiver system comprising:

a base site controller, comprising:

a transmitter for transmitting first type messages and second type messages to at least one selective call receiver;

a determinator, coupled to the transmitter, for determining whether a message to be transmitted is the first type message or the second type message wherein the determinator characterizes the message as being the first type message in response to the message having a message length less than a predetermined threshold; and an encoder, responsive to the determinator, for encoding the message as the first type message or the second message for transmission to the at least one selective call receiver, the at least one selective call receiver, comprising:

a receiver for receiving the first type message and the second type message;

a decoder, coupled to the receiver, for decoding whether the message is the first type or second type message;

a first display, coupled to the decoder, for displaying the first type message, said first display being integrally coupled on a first surface of a housing for enclosing the receiver and the decoder;

a second display, coupled to the decoder, for displaying the second type message, said second display being integrally coupled on a second surface of said housing; and a selector for selecting the first or second display responsive to the decoder for conserving battery power, the selector conserving battery power by selecting the second display for displaying the second type message and deselecting the second display when the second type message has been displayed.

* * * * *